US009137651B2

(12) United States Patent
Agarwal et al.

(10) Patent No.: US 9,137,651 B2
(45) Date of Patent: Sep. 15, 2015

(54) SYSTEMS AND METHODS FOR DETERMINING RELATIONSHIPS BETWEEN MOBILE APPLICATIONS AND ELECTRONIC DEVICE USERS

(75) Inventors: Vikas Agarwal, New Delhi (IN); Sumit Mittal, New Delhi (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 13/302,198

(22) Filed: Nov. 22, 2011

(65) Prior Publication Data

US 2013/0132938 A1 May 23, 2013

(51) Int. Cl.
*G06F 9/44* (2006.01)
*H04W 4/20* (2009.01)
*G06F 9/445* (2006.01)

(52) U.S. Cl.
CPC .............. *H04W 4/206* (2013.01); *G06F 8/60* (2013.01); *G06F 9/44* (2013.01)

(58) Field of Classification Search
USPC .............. 717/177, 101; 705/34, 14.43, 14.73; 707/769, 758; 455/414.1, 419; 726/21; 725/13; 713/191
IPC ...................................................... H04W 4/206
See application file for complete search history.

(56) References Cited

U.S. PATENT DOCUMENTS

| | | | |
|---|---|---|---|
| 6,487,718 B1 * | 11/2002 | Rodriguez et al. ............ 717/177 |
| 2004/0003266 A1 * | 1/2004 | Moshir et al. ................. 713/191 |
| 2007/0180519 A1 * | 8/2007 | Boccon-Gibod et al. ....... 726/21 |
| 2008/0147530 A1 * | 6/2008 | Kwan et al. ..................... 705/34 |
| 2008/0162627 A1 | 7/2008 | Sylvain |
| 2008/0201731 A1 * | 8/2008 | Howcroft ......................... 725/13 |
| 2009/0285376 A1 | 11/2009 | Kremer-Davidson et al. |
| 2009/0298480 A1 * | 12/2009 | Khambete et al. ......... 455/414.1 |
| 2010/0076994 A1 * | 3/2010 | Soroca et al. ................. 707/769 |
| 2010/0125498 A1 | 5/2010 | Jaramillo |
| 2010/0138278 A1 | 6/2010 | Aghasaryan |
| 2010/0169340 A1 * | 7/2010 | Kenedy et al. ................ 707/758 |
| 2010/0250337 A1 | 9/2010 | Kassaei |
| 2010/0293048 A1 * | 11/2010 | Singolda et al. ........... 705/14.43 |
| 2012/0123876 A1 * | 5/2012 | Sista et al. ................. 705/14.73 |

OTHER PUBLICATIONS

Buvat, Jerome et al.; "Mobile Application Stores Assessing Opportunities for Telecom Operators"; Capgemini 2010; Telecom, Media & Entertainment; 16 pages.

(Continued)

*Primary Examiner* — Tuan Vu
(74) *Attorney, Agent, or Firm* — Schmeiser, Olsen & Watts LLP (57) ABSTRACT

A system and method are provided for generating a mobile software program for prospective users. Telecommunications data is received from a telecommunications source. Snapshot data is generated that is related to one or more software programs downloaded to an electronic device. A relevance matrix is generated from the generated snapshot data and the telecommunications data to determine a first software program of the one or more software programs for a predetermined first consumer of the electronic device users or to determine a plurality of second consumers of the electronic device users for receiving data related to a second software program of the plurality of the one or more software programs.

20 Claims, 5 Drawing Sheets

(56) References Cited

OTHER PUBLICATIONS

Professional Access Pvt. Ltd.; "Integrated Commerce Suite for Telecom Solution Guide"; http://www.professionalaccess.com/pdf-Files/ICS_Telecom_SolutionGuide.pdf; last downloaded Nov. 22, 2011; 28 pages.

Ahn, Hyunchul et al.; "Using Hybrid Data Mining Techniques for Facilitating Cross-Selling of a Mobile Telecom Market to Develop Customer Classification Model"; IEEE Xplore; Mar. 11, 2010; http://ieeexplore.ieee.org/xpl/freeabs_all.jsp?arnumber=5428637; last downloaded Nov. 22, 2011; 1 page.

xoriant.com; "Telecom & Mobile Application Development"; http://www.xoriant.com/telecom-wireless-technologies.html; last downloaded Nov. 22, 2011; 1 page.

MarketingYour app.com; "3 Essential Tips to Boost Your App Store Profits"; http://www.marketingyourapp.com/2010/04/3-essential-tips-to-boost-your-app-store-profits/; last downloaded Nov. 22, 2011; 6 pages.

* cited by examiner

SYSTEMS AND METHODS FOR DETERMINING RELATIONSHIPS BETWEEN MOBILE APPLICATIONS AND ELECTRONIC DEVICE USERS

FIELD OF THE INVENTION

The present invention relates generally to computer software applications, and more specifically to systems and methods for determining relationships between software applications and prospective users of the software applications.

BACKGROUND

Due to rapid enhancements in computing power, memory, display, etc., smartphones and related mobile devices have emerged as a platform for executing a variety of different applications. With the increasing popularity of mobile applications, companies like Apple™ and Google™ offer online application distribution centers. An indication of the popularity of the use of application distribution centers is that, to date, over 200 million iOS users have downloaded over 15 billion applications from the Apple™ application retrieval facility, referred to as the App Store. Many more mobile device users have downloaded applications from other sources, for example, from vendor websites and other content storage repositories in communication with the internet.

A mobile device user typically subscribes to a service offered by a telecommunications ("telecom") network provider, which provides the physical infrastructure for transmitting requested applications from an app store to the mobile device user during a downloading operation.

BRIEF SUMMARY

In one aspect, provided is a computer-implemented method. The method comprises receiving telecommunications data related to a plurality of electronic device users from a telecommunications source; generating snapshot data related to one or more software programs downloaded to an electronic device; and generating a relevance matrix from the generated snapshot data and the telecommunications data to at least one of determine a first software program of the one or more software programs for a predetermined first consumer of the electronic device users and determine a plurality of second consumers of the electronic device users for receiving data related to a second software program of the plurality of the one or more software programs.

In another aspect, provided is a computer-implemented method. The method comprises characterizing telecom data related to the user; correlating the telecom data with application download data and application and consumer metadata; determining whether the online applications are relevant to the user; and determining one or more relevant channels for the user.

In another aspect, an application relevance core system comprises a telecommunications data repository and a relevance determination engine. The telecommunications data repository includes telecommunications data related to a plurality of electronic device users that is received from a telecommunications source and snapshot data related to one or more software programs downloaded to an electronic device. The relevance determination engine generates a relevance matrix from the snapshot data and the telecommunications data to at least one of determine a first software program of the one or more software programs for a predetermined first consumer of the electronic device users and determine a plurality of second consumers of the electronic device users for receiving data related to a second software program of the plurality of the one or more software programs.

In another aspect, provided is a computer program product. The computer program product comprises a computer readable storage medium having computer readable program code embodied therewith. The computer readable program code comprises computer readable program code configured to receive telecommunications data related to a plurality of electronic device users from a telecommunications source; computer readable program code configured to generate snapshot data related to one or more software programs downloaded to an electronic device; and computer readable program code configured to generate a relevance matrix from the generated snapshot data and the telecommunications data to at least one of determine a first software program of the one or more software programs for a predetermined first consumer of the electronic device users and determine a plurality of second consumers of the electronic device users for receiving data related to a second software program of the plurality of the one or more software programs.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

A limitation of popular application stores is that it is difficult for computer users, in particular, mobile device users, to locate applications of interest among the plethora of applications available for download. Also, software vendors and service providers often find it difficult to identify a target customer base which may be interested in certain applications.

In brief overview, systems and methods are provided for incorporating various data sources available to a telecom network provider to efficiently provide data related to applications to electronic device users identified as being possibly interested in the applications. Accordingly, the systems and methods can be applied in a network environment that includes an application store hosted by a telecom network provider, referred to as a telecom app store.

Telecom network providers have access to some important data, such as real-time data, for example, for determining a mobile device location using GPS. Other data can include keywords, tags, metadata information attached to an application, and the like. This data can be processed according to an embodiment of the inventive concepts, producing results that can be used for identifying applications that may be of interest to a set of mobile device users, for example, a subset of the telecom network provider's customer base. For example, if an application is suited for a particular tourist spot, the application can be recommended to mobile device users visiting that spot. These users can be identified as consumers who may be interested in purchasing the application by using location information of the users, which can be determined by information available to a telecom network provider. In another example, information about a video streaming application can be provided to users subscribing to an unlimited high-speed data plan. In other embodiments, a telecom network provider can determine the social relationships of their customers based on their calling and messaging patterns. This data can be used to recommend to a mobile device user those applications which are of interest to the mobile device user's friends or other social acquaintances.

Figure 1:
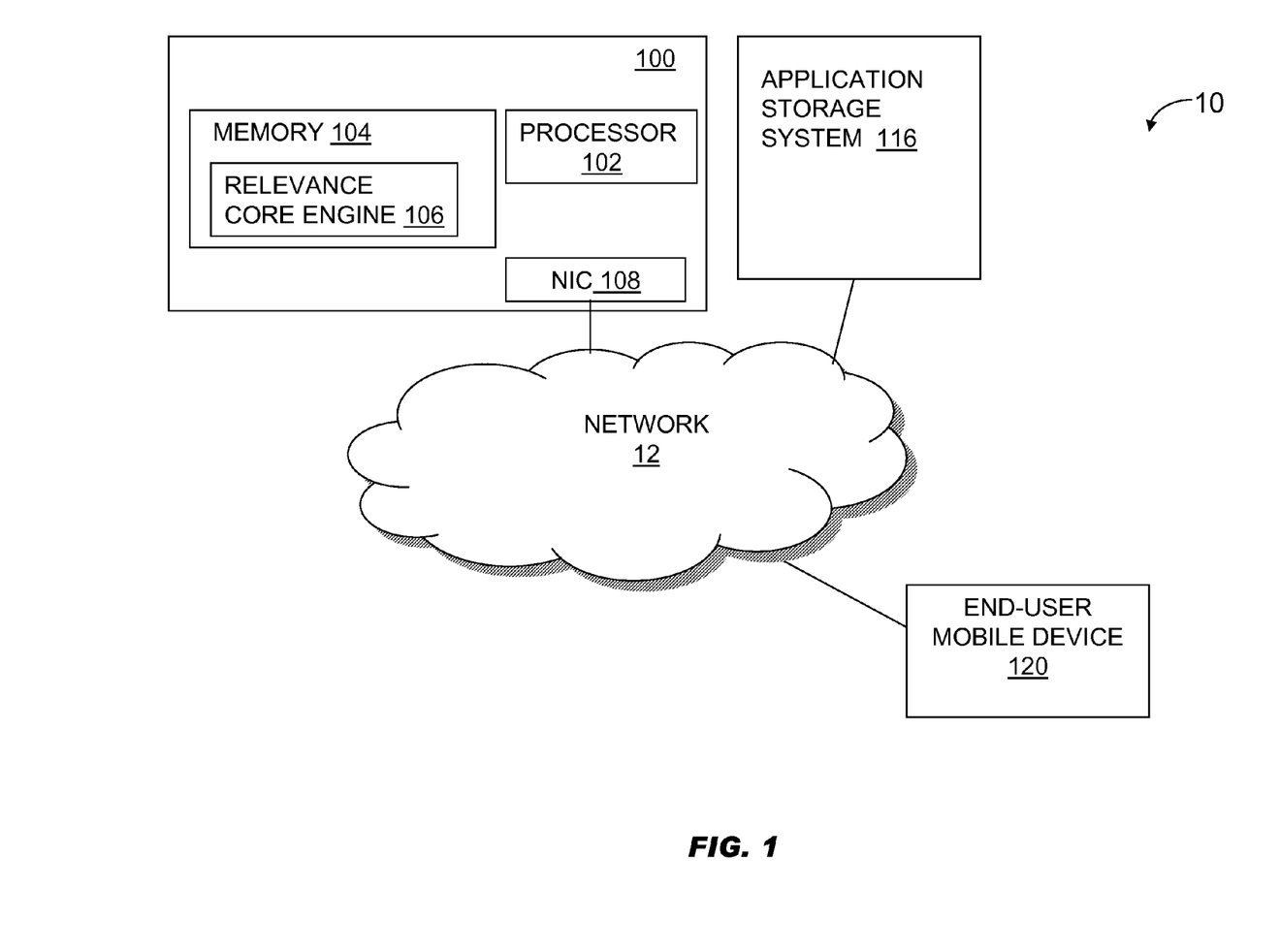
FIG. 1 is a block diagram of an application store environment in which embodiments of the present inventive concepts can be practiced.

FIG. 1 is a block diagram of an application store environment 10 in which embodiments of the present inventive concepts can be practiced.

The application store environment 10 includes an application-user relationship identification system 100 and an application storage system 116 in communication with a network 12. The application-user relationship identification system 100 and/or the application storage system 116 can be hosted by a telecom network provider or other entity responsible for management and control of the network 12. The network 12 can include one or more of a public switched telephone network (PSTN), cellular or other mobile communications network, data network, satellite network such as the Global Positioning System (GPS), or any other network known to those of ordinary skill in the art as being capable of transmitting voice, data, and/or video. The internet or other e-commerce network can be part of the network 12.

At least one end-user mobile device 120 or other electronic device capable of processing software applications can be connected to the network 12. The mobile device 120 can be configured with a browser or other interface for permitting a user, for example, a consumer, to download applications from the application storage system 116 and execute the applications on the mobile device 120. The mobile device user can be a customer of the telecom network provider in control of some or all of the network 12.

The application-user relationship identification system 100 includes a processor 102, a memory 104, and a network interface 108, which can communicate with each other via a bus and/or data connector (not shown). The memory 104 includes a relevance core engine 106. The network interface 108 can include one or more adaptors for communicating with the mobile device 120 or other electronic devices via the network 12.

The memory 104 can include volatile memory, for example, RAM and the like, and/or non-volatile memory, for example, ROM, flash memory, and the like. The memory 104 can include removable and/or non-removable storage media implemented in accordance with methods and technologies known to those of ordinary skill in the art for storing data. Stored in the memory can include program code, such as program code of an operating system executed by the processor 102, and/or program code corresponding to contents of the relevance core engine 106.

The relevance core engine 106 can serve as a "matchmaker" between consumers and applications. For example, the relevance core engine 106 can determine the most relevant applications that can be provided to specific mobile device users, and/or determine which mobile device users should receive certain applications, based at least in part on telecommunications data. The relevance core engine 106 can also determine the best channel for providing an application to a user.

Figure 2:
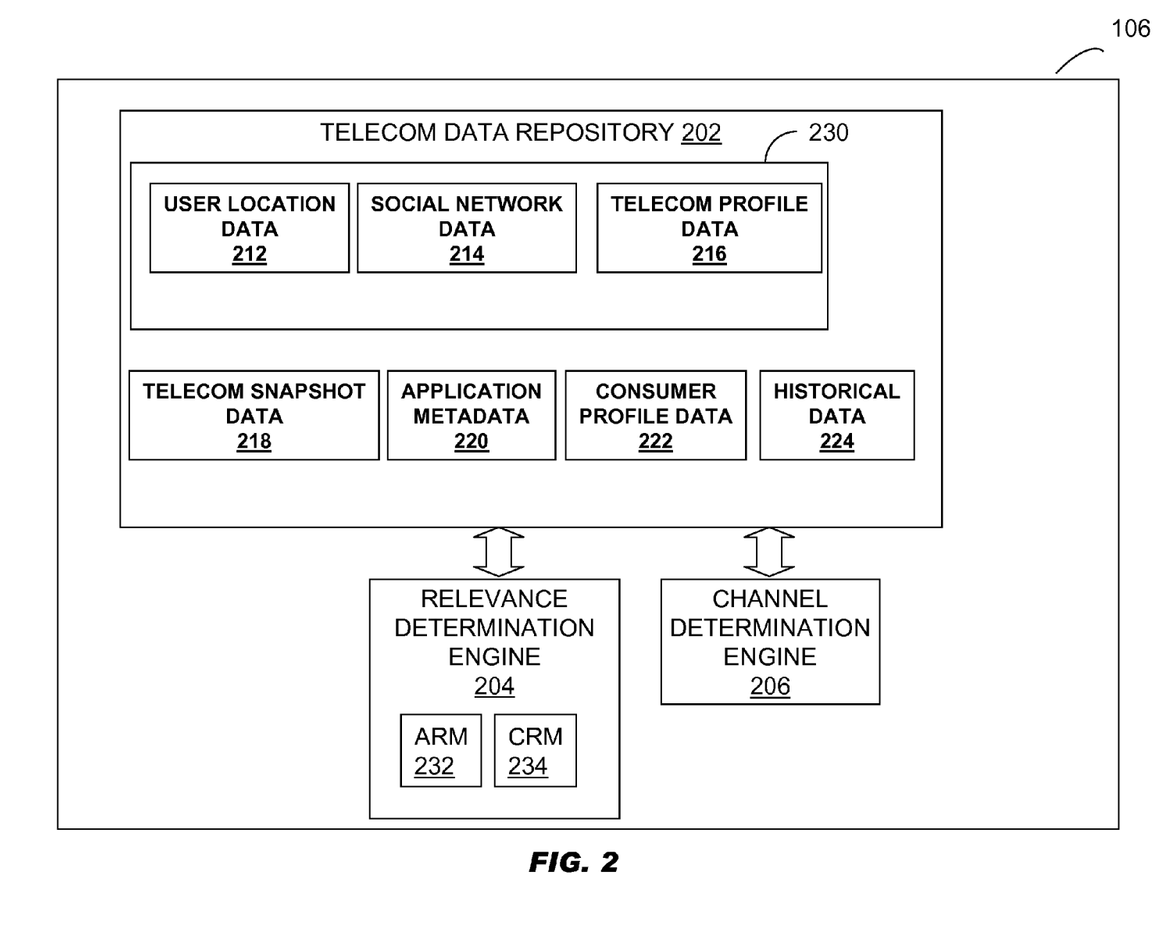
FIG. 2 is a block diagram of the relevance core engine shown in FIG. 1, in accordance with an embodiment.

FIG. 2 is a block diagram of the relevance core engine 106 shown in FIG. 1, in accordance with an embodiment. The relevance core engine 106 can execute entirely on the application-user relationship identification system 100. Alternatively, some elements of the relevance core engine 106 can execute on the application-user relationship identification system 100, while other elements can execute on a remote computer such as the application storage system 116 and/or the end-user computer 120. The relevance core engine 106 can include hardware, software, firmware, or a combination thereof.

The relevance core engine 106 includes a telecommunications data repository 202, a relevance determination engine 204, and a channel determination engine 206.

The telecommunications data repository 202 contains data that can be used to provide data related to applications to a target set of consumers or other users. This data can include information that is not available in a conventional application store hosted by a vendor such as Apple™ or Android™. Instead, this data can include information available to a telecommunications network provider, also referred to as telecommunications data 230. Other data can include telecom snapshot data 218 application metadata 220, consumer profile data 222, and historical data 224 related to an application search or application usage by a consumer which can be analyzed with the telecommunications data 230 to determine approaches for providing applications to consumers and the like.

The telecommunications data 230 can include user location data 212, social network data 214, and/or telecommunications profile data 216. The user location data 212 can include real-time location information of mobile device users, more specifically, subscribers of a service offered by the telecom network provider. The user location data 212 can be made available via techniques including but not limited to cell tower triangulation, GPS, and the like. The user location data 212 can be represented at different granularities, such as one or more countries, cities, areas within a city, specific points, i.e., at a particular longitude and latitude, neighborhood definition, and so on.

The location data 212 can include other real-time information such as presence zone information, which can detect duration of stay of a mobile device user in a particular location. The presence zone information can be used to identify a base location of a mobile device user based on the amount of time that the user spends at that location, and can be used to determine travel patterns, frequently visited places, and so on. Application download and usage data can be linked to a particular location-time combination, for example, indicating that the user is at home in the evening. Certain applications such as travel-related applications may have higher download rates by mobile device users who are traveling than those users who do not travel. Similarly, some users of a mobile device may download new applications in their spare time while being away from home, office, and the like. In these examples, the presence zone information can be useful in providing data related to the applications to mobile device users who may be interested in such applications due in part to location and the like.

Location and presence-related information provided by a telecom network provider can be utilized in the relevance core engine 106 to provide a telecom app store a perspective of the consumer as well as the application. More specifically, for a consumer user of a mobile device, this information can be used by the relevance core engine 106 to compute the locations where a user downloads most applications to the user's computer, any influence of the downloaded applications with respect to the user's travel plans, etc. On the other hand, for the applications, this data is helpful in analyzing the locations where a particular application is primarily downloaded, and whether such downloads occur while users are away from their base location, or while traveling.

In an embodiment, a notification interface (not shown) can be provided, for example, configured on the end user mobile device 120 for generating a notification of application usage. For example, when a particular application is executed on a mobile device, a notification can be output, for example, sent as part of an SMS message inside of an application indicating that the application is in use. A telecom network operator can therefore capture this data, which can be used by the relevance core engine 106 to draw a correlation between the application usage and other data, for example, a location of the mobile device 120 during such use.

The social network data 214 can include information for identifying acquaintances, or relationships, of a consumer user. It is well-known that consumers can be influenced by their friends, family members, or other acquaintances, and that a consumer is more likely to buy an application that is already bought by her friends for several reasons. One reason is that the consumer is likely to share interests with a friend, a relative, or other close acquaintance. Another reason is that the friend, relative, or close acquaintance might recommend an application he or she is using. A telecom network provider acquires data useful in assisting a user to locate friends or other people having a relationship with the user. Such data can include but not be limited to telecommunications data related to phone call and/or SMS message transactions.

The social network data 214 can be represented as a graph, referred to as a social network graph. The social network graph can be a directional graph with nodes representing users identified by their mobile number, SMS handle, or other identification. When a call, SMS exchange, and the like is established between two users, an edge can be created between corresponding nodes. The weight of an edge will represent the strength of relationship between the corresponding users calculated using information such as total call duration and the frequency of calls, SMS messages, or related communications. Based on analysis of this graph, a friend list can be formed for each user. A friend list is represented as:

<(friend1, w1), (friend2, w2), . . . (friendn, wn)>, where w1, w2, . . . wn is the weight of the corresponding edge.

The relevance core engine 106 can process a friend list or other social data 214 to compute the influence of friends on a user's download patterns. This data 214 can also be used to ascertain whether downloads occur by a group of friends together, indicating the inherent social nature of a particular application.

The telecommunications profile data 216, like the location, presence, and social networking data, can be received from a telecommunications network provider. The profile data 216 can include data related to a user's service plan, for example, phone plan, data plan, and so on. For example, users with a plan offering unlimited data may use web-based applications more often than a user with a limited data plan. Similarly, users with compelling call or SMS plans may be inclined to use social applications more often than users with limited calling plans. Other data 216 can relate to telecom channel use, for example, SMS, call or web channels varies significantly for users. Channel use data can be used to help advertisers select the best channel from SMS advertisements, promotional calls, call-back tunes, web advertisements, and so on, thereby providing more visibility with respect to online promotions.

The telecommunications snapshot data 218 can be generated by associating the abovementioned telecommunications data 230 with data related to an application download, for example, a time of the download, location of the download, and so on. An example of a telecommunications snapshot is as follows:

<user id, application id, timestamp><user location, user presence, user friend list, user telecom profile>

The application metadata 220 can include keywords, tags, categories, or other metadata-related information corresponding to one or more applications.

The consumer profile data 222 can include data such as demographic or other user-related personal data, such as age, gender, and so on.

The historical data 224 can include data regarding usage of applications, consumer search history data, and the like.

The relevance determination engine 204 generates an application relevance matrix (ARM) module 232 and/or a consumer relevance matrix (CRM) module 234 to determine which applications to promote to a specific user and to identify users for receiving data related to a given application, respectively, by assimilating contents of the telecom data repository 202 such as the telecommunications snapshot data 218 and the telecommunications data 230. The application relevance matrix module 232 is generated with an applications metadata table. The consumer relevance matrix module 234 is generated with a user metadata table. The application and user metadata table contains an entry for each dimension that further qualifies the dimension. For example, in the case of a location dimension for application relevance matrix, this contains the most popular download locations for that application.

The application relevance matrix module 232 determines weights for various dimensions that can influence the purchase behavior of consumers. A dimension can correspond to a location, presence, social network, purchase history, and so on, as described herein. In one embodiment, the relevance determination engine 204 determines a location-related weight. For example, if an application is downloaded by several users from one or more common locations, then a high weight is assigned to this dimension in the relevance matrix. The exact value of this weight can be determined by a function that incorporates total unique download locations against total downloads. The identified popular download locations with relative weights are determined and associated with the application in the application metadata table.

In another embodiment, the relevance determination engine 204 determines a presence-related weight for the application relevance matrix module 232. For example, if an application is downloaded by several users from a location where the users have a short-term or long-term presence, then a high weight is assigned to this dimension in the relevance matrix. The presence data is determined to be associated with the downloaded application in the application metadata table.

In another embodiment, the relevance determination engine 204 determines a social measure-related weight for the application relevance matrix module 232. For example, the relevance determination engine 204 can determine from contents of the telecom data repository 202, for example, social network data 214, that an application is used in certain social groups. A high weight can be assigned to this dimension, determined by a function that incorporates downloads by friends against total downloads. Data related to the users for example, friends who have downloaded the application together, are stored in the application metadata table.

In another embodiment, the relevance determination engine 204 determines a purchase history-related weight for the application relevance matrix module 232. For example, if an application is downloaded by several users with a particular calling plan or data plan, then a high weight is assigned to this dimension in the relevance matrix determined by a function that incorporates downloads by different plans against total downloads. The popular plans corresponding to application downloads are stored in the application metadata table.

The consumer relevance matrix module 234 determines weights for various dimensions that can influence purchase behavior based on a user's dynamic profile, past purchases, and the like.

In one embodiment, the relevance determination engine 204 determines a location-related weight for the consumer relevance matrix module 234. For example, if a user downloads many applications from particular location(s), then a high weight is assigned to this dimension in the consumer relevance matrix module 234. The identified locations are determined to be associated with the user in the user metadata table.

In another embodiment, the relevance determination engine 204 determines a presence-related weight for the consumer relevance matrix module 234. For example, if a short-term or long-term presence of a user is determined to influence previous purchase decisions, then a high weight is assigned to this dimension in the consumer relevance matrix module 234. Corresponding entries regarding popular presence zones are made in the user metadata table.

In another embodiment, the relevance determination engine 204 determines a social network-related weight for the consumer relevance matrix module 234, for example, a weight proportionate to the influence of friends, acquaintances, or other social relationships of a user with respect to the user's application download behavior. The determined weight data is stored in the consumer relevance matrix module 234. The user metadata table includes data relating to individual friends, acquaintances, or other social relationships and corresponding influences, for example, total downloads together with this friend.

In another embodiment, the relevance determination engine 204 determines a purchase history-related weight for the consumer relevance matrix module 234. For example, if a user downloaded several applications according to a particular calling plan or other telecommunications profile, then a high weight is assigned to this dimension in the consumer relevance matrix module 234. The popular plans are stored in the user metadata table.

The relevance determination engine 204 can build an application relevance matrix module 232 for each application and a consumer relevance matrix module 234 for each user. When a new user or application is identified, default values can be provided, which can be adjusted over time as additional data is acquired by the relevance core engine 106.

The relevance determination engine 204 uses the weighted matrices, i.e., application relevance matrices and/or consumer relevance matrices, to determine which applications to promote to a user, or to identify users who may be interested in an application. The relevance of a particular application or user is based on the weights determined for the application relevance matrix module 232 or the consumer relevance matrix module 234.

The channel determination engine 206 uses channel usage information to determine the best channel for providing data related to an application to a user. Such data can be sent to a user according to a preferred channel used by the user.

Figure 3:
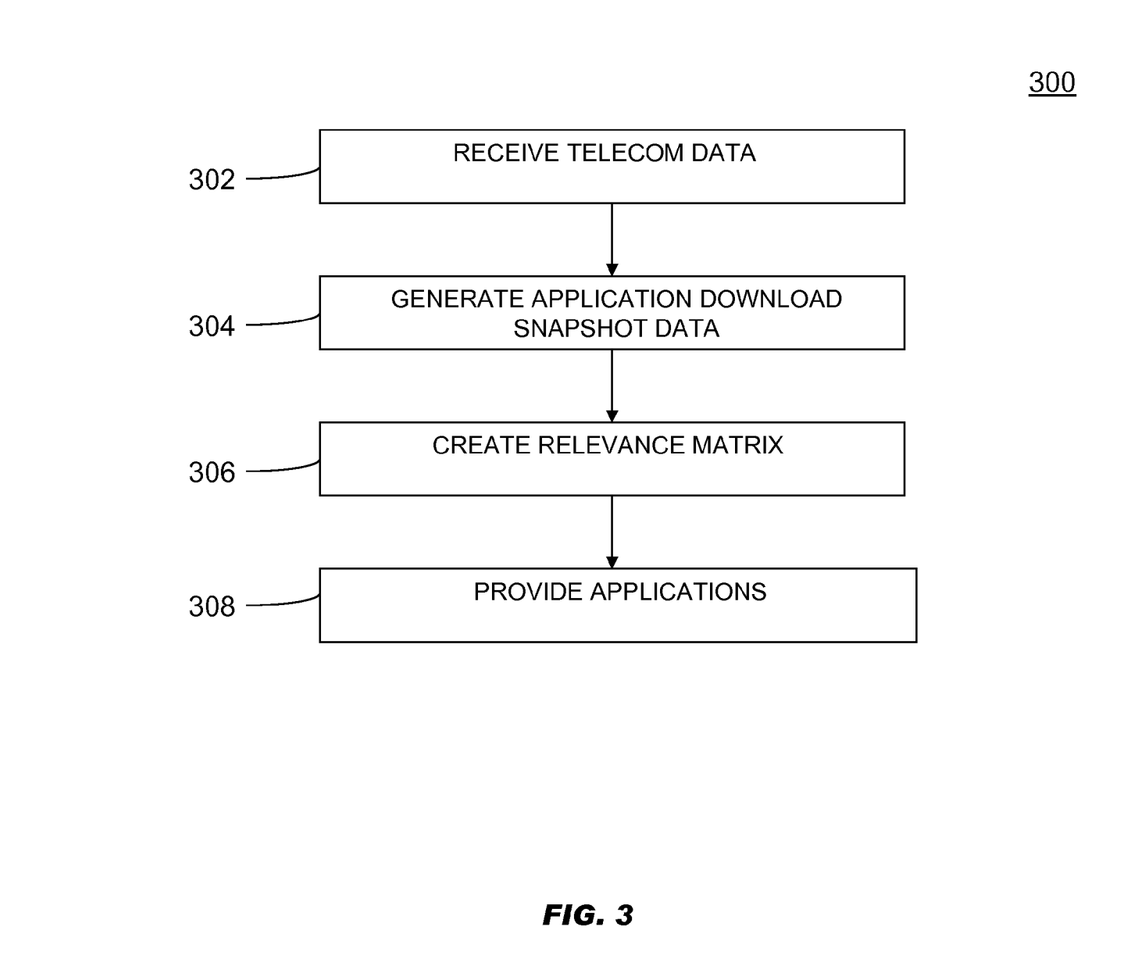
FIG. 3 is a flow diagram of a method for providing software applications, in accordance with an embodiment.

FIG. 3 is a flow diagram of a method 300 for providing software applications, in accordance with an embodiment. In describing the method 300, reference is also made to elements of FIGS. 1 and 2. Some or all of the method 300 can be governed by instructions that are stored in the memory 104 and can be executed by the processor 102 of the application-user relationship identification system 100.

At block 302, telecommunications data can be received for use in identifying consumers possibly interested in an application. The telecommunications data can be related to applications at an application store. The telecommunications data can also be related to users of the applications, or consumers who may be interested in downloading the applications. The application store can be provided by a telecommunications provider, referred to as a telecom application store.

At block 304, one or more snapshots can be generated of an application download. The telecom snapshot data 218 can be stored in the telecom data repository 202.

At block 306, at least one relevance matrix, for example, application relevance matrix module 232 and/or consumer relevance matrix module 234, is created. In The corresponding metadata table is also created.

At block 308, data related to one or more applications are provided based on the relevance matrix. One type of data can include promotional material, where the most relevant applications are selected and the material is provided to a given consumer. Another type of data can be used in campaigns, where a set of users are selected and data related to a given application can be provided to them.

Figure 4:
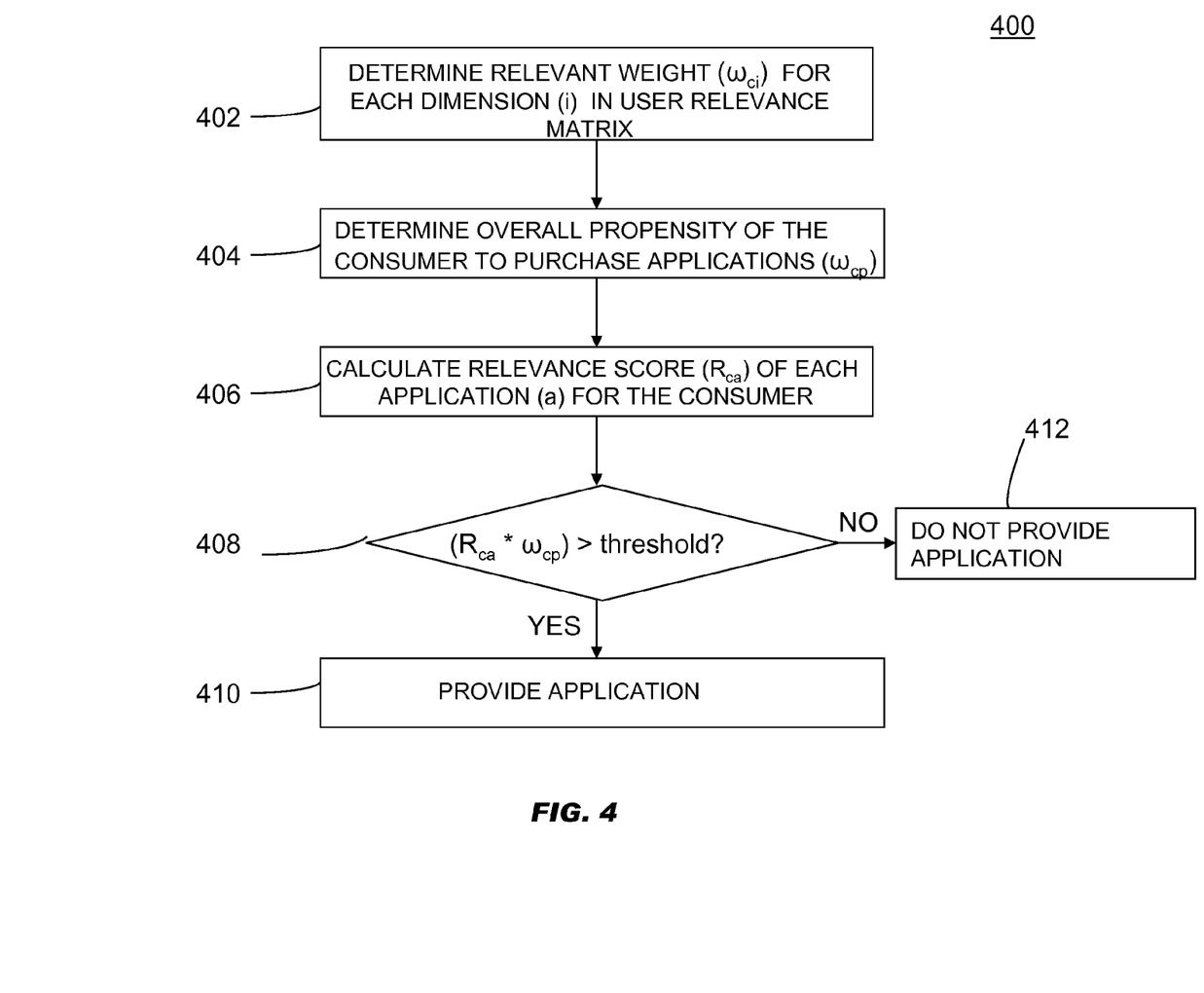
FIG. 4 is flow diagram of a method for determining which applications to provide to a particular consumer, in accordance with an embodiment.

FIG. 4 is flow diagram of a method 400 for determining which applications to provide to a particular consumer, in accordance with an embodiment. In describing the method 400, reference is also made to elements of FIGS. 1-3. Some or all of the method 400 can be governed by instructions that are stored in the memory 104 and can be executed by the processor 102 of the application-user relationship identification system 100.

At block 402, a relative weight ($\omega_{ci}$) is determined for each dimension 'i' in the consumer relevance matrix module 234 for that user. This can be calculated by analyzing an influence of this dimension on application purchase decision, as described before, and normalizing it. Each weight ranges from 0 to 1. The sum of all weights is 1.

At block 404, an overall propensity of the consumer to purchase applications ($\omega_{cp}$) can be determined. (Calculated as a function of applications browsed and downloaded, normalized to be a value between 0 and 1).

At block 406, a relevance score $R_{ca}$ is calculated for each application 'a' for this consumer: $R_{ca}=\Sigma(\omega_{ci}*s_{ia})$, where $s_{ia}$ is a normalized value which indicates satisfaction of dimension 'i' for this application. For each dimension, different functions are used to determine the satisfaction. For example, satisfaction of the 'social' dimension is calculated as a function of how many friends have downloaded this particular application and the influence of those friends on the consumer, for example, determined by the weight of the corresponding edge in the Social Network graph. Similarly, purchase history of the application and the consumer is used to give high scores to applications similar to ones the consumer has purchased before or that have been purchased by users of similar Telecom plans.

At decision block 408, a determination is made that if $(R_{ca}*\omega_{cp})$ is greater than (>) Threshold 'Tc', then at block 410 data related to the application is provided. Intuitively, this considers both the propensity of consumer to purchase applications as well as relevance of the application in question). Otherwise, at block 412, the application is not provided.

Figure 5:
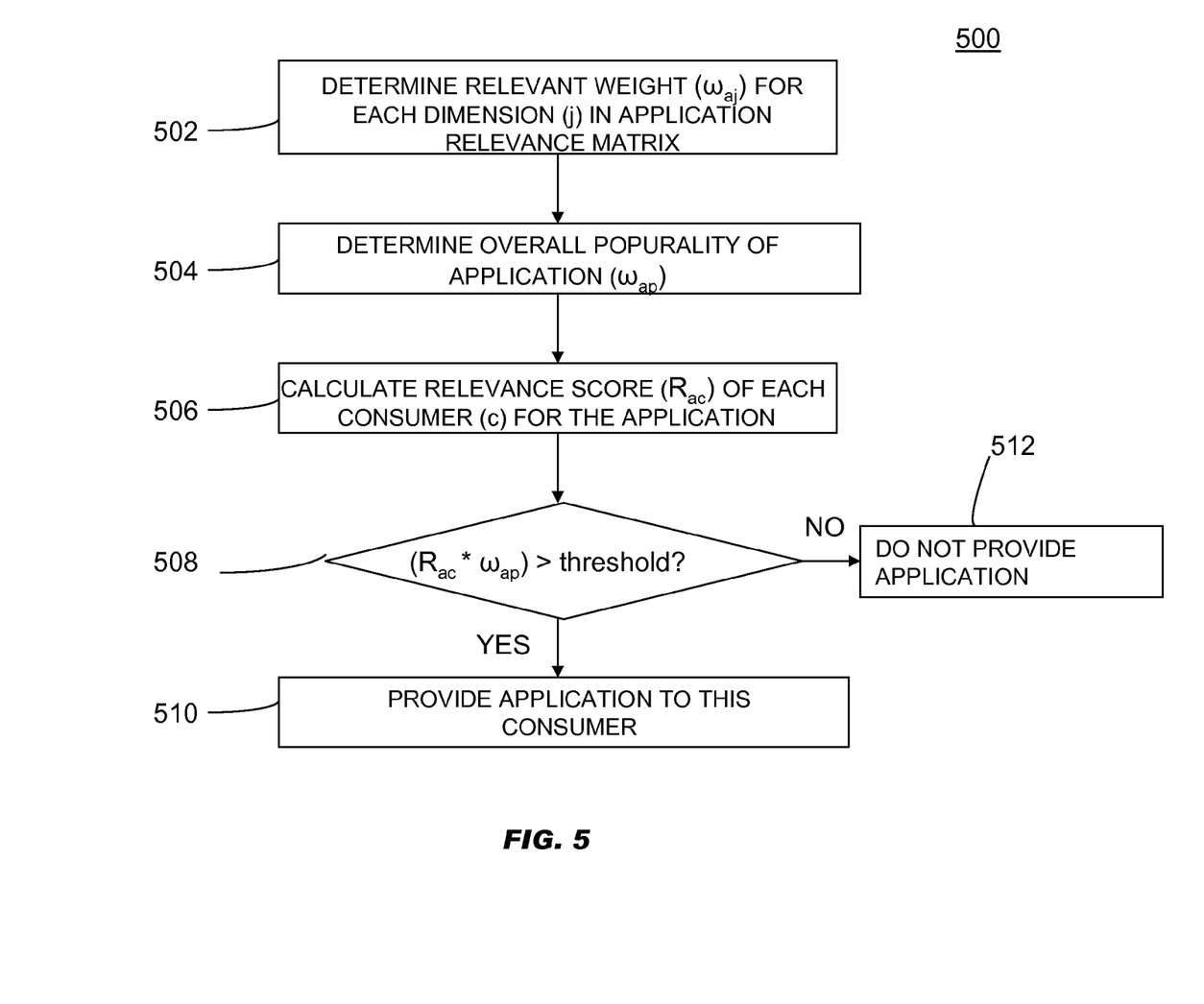
FIG. 5 is a flow diagram of a method for determining consumers to whom an application can be provided, in accordance with an embodiment.

FIG. 5 is a flow diagram of a method 500 for determining consumers to whom an application can be provided, in accordance with an embodiment. In describing the method 500, reference is also made to elements of FIGS. 1-3. Some or all of the method 500 can be governed by instructions that are stored in the memory 104 and can be executed by the processor 102 of the application-user relationship identification system 100.

At block 502, a relative weight $(\omega_{aj})$ is determined for each dimension 'j' in the application relevance matrix module 232 for that application. This can be calculated by analyzing an influence of this dimension on application purchase decision, as described before, and normalizing it. Each weight ranges from 0 to 1. The sum of all weights is 1.

At block 504, an overall popularity of this application $(\omega_{ap})$ can be determined. (Calculated as a function of total downloads, normalized to be a value between 0 and 1).

At block 506, a relevance score $R_{ac}$ is calculated for each consumer 'c' for this application: $R_{ac}=\Sigma(\omega_{aj}*s_{jc})$, where $s_{jc}$ is a normalized value indicating satisfaction of dimension 'j' for the consumer. For example, satisfaction of the 'presence' dimension is determined by evaluating the current presence zone of the consumer and that whether the application is suitable for that presence zone. Similarly, satisfaction of 'social' dimension is based on the number of friends of the consumer who have downloaded this application and the influence of those friends on the consumer.

At decision block 508, a determination is made that if $(R_{ac}*\omega_{ap})$ is greater than (>) Threshold 'Tc', then at block 510 data related to the application is provided to this consumer. Intuitively, this considers both the application popularity as well as relevance of this application to a consumer. Otherwise, at block 512, data related to the application is provided to this consumer. Alternatively, instead of providing data related to the identified software applications, the telecom network provider can provide product or service data using similar methodologies.

As will be appreciated by one skilled in the art, aspects of the present invention may be embodied as a system, method or computer program product. Accordingly, aspects of the present invention may take the form of an entirely hardware embodiment, an entirely software embodiment, for example, including firmware, resident software, micro-code, etc., or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method, comprising:
   receiving, by a telecommunications data repository of an application relevance core engine, telecommunications data related to a plurality of electronic device users from a telecommunications source;
   associating the telecommunications data with data related to an application downloaded by an electronic device to generate snapshot data pertaining to the application download which is stored at the telecommunications data repository, the application being one of a plurality of applications; and
   generating both an application relevance matrix for each application of the plurality of applications and a consumer relevance matrix for a consumer of the plurality of electronic device users for determining an application of the plurality of applications to promote to the consumer of the plurality of electronic device users from the snapshot data and the telecommunications data, wherein the consumer relevance matrix includes at least one dimension that corresponds to at least one of a location, presence, social network, purchase history, or profile of the consumer and a weight corresponding to the at least one dimension, wherein determining the application to promote to the consumer comprises calculating a relevance score for each of other applications downloaded by the electronic device, and multiplying the relevance score to a value corresponding to a propensity of the consumer to purchase applications, which is determined as a function of a plurality of applications browsed and downloaded by the consumer, and comparing a result of multiplying the relevance score to the value to a threshold value to determine whether to provide promotional material related to the application to the consumer.

2. The computer-implemented method of claim 1, further comprising determining a channel for outputting at least one of data related to the first software program and the data related to the second software program.

3. The computer-implemented method of claim 2, wherein the channel includes at least one of a voice channel, an SMS channel, and a web channel.

4. The computer-implemented method of claim 1, wherein the telecommunications data includes at least one of user location data, social network data, and telecommunications profile data.

5. The computer-implemented method of claim 1, further comprising generating at least one of the application relevance matrix and the consumer relevance matrix from at least one of application metadata, historical data, and consumer profile data.

6. The computer-implemented method of claim 5, further comprising:
   refining results of a consumer search based on the application and consumer relevance matrices.

7. The computer-implemented method of claim 1, wherein the application relevance matrix includes weights for the at least one dimension that influence purchase behavior.

8. The computer-implemented method of claim 7, wherein the at least one dimension include telecom dimensions and non-telecom dimensions.

9. The computer-implemented method of claim 8, wherein the method further comprises considering the relevance of each telecom and non-telecom dimension with respect to values for the at least one dimension in the one or more software programs.

10. The computer-implemented method of claim 1, wherein the consumer relevance matrix includes weights for various dimensions of the at least one dimension that influence purchase behavior based on a dynamic profile of the users.

11. The computer-implemented method of claim 10, wherein the at least one dimension include telecom dimensions and non-telecom dimensions.

12. The computer-implemented method of claim 1, wherein the method further comprises considering the relevance of each telecom and non-telecom dimension with respect to values for the at least one dimension in consumer data.

13. The computer-implemented method of claim 1, wherein the dimensions include a location dimension, and the relative weight for the location dimension is a location-related weight that is determined by a function that incorporates total unique locations where in the application is downloaded against total downloads of the application.

14. A computer-implemented method, comprising:
   characterizing telecom data related to an electronic device user;
   correlating the telecom data with application download data and application and consumer metadata to generate snapshot data pertaining to the application download data which is stored at the telecommunications data repository;
   determining a consumer to whom an application can be provided from the snapshot data, the application download data, and the telecom data, including generating both an application relevance matrix and a consumer relevance matrix,
   wherein the application relevance matrix is generated for the application, the application relevance matrix including at least one dimension that corresponds to at least one of a location, presence, social network, purchase history, or profile of the consumer and a weight corresponding to the at least one dimension, wherein determining the consumer to whom an application can be provided comprises calculating a value corresponding to an overall popularity of the application, which is determined as a function of the application download data, including total downloads of the application browsed and downloaded by other consumers, calculating a relevance score for each consumer for the application, and multiplying the relevance score to the value corresponding to the overall popularity of the application, and comparing a result of multiplying the relevance score to the value to a threshold value to determine whether to provide promotional material related to the application to the consumer.

15. The computer-implemented method of claim 14, further comprising identifying presence regions of a user based on the user's past locations and duration of stay in those locations.

16. An application relevance core system computer having a processor, comprising:
   a telecommunications data repository that includes telecommunications data related to a plurality of electronic device users that is received from a telecommunications source and snapshot data pertaining to an application download that is generated from the telecommunications data associated with the downloaded application; and
   a relevance determination engine that generates both an application relevance matrix module and a consumer relevance matrix module to determine an application to promote to a consumer, the application and consumer relevance matrices generated from the telecommunications snapshot data and the telecommunications data, wherein the consumer relevance matrix includes at least one dimension that corresponds to at least one of a location, presence, social network, or purchase history of the consumer and a weight corresponding to the at least one dimension that is determined according to a profile of the consumer, wherein determining the application to promote to the consumer comprises calculating a relevance score for each of other applications downloaded by the electronic device, and multiplying the relevance score to a value corresponding to a propensity of the consumer to purchase applications, which is determined as a function of a plurality of applications browsed and downloaded by the consumer, and comparing a result of multiplying the relevance score to the value to a threshold value to determine whether to provide promotional material related to the application to the consumer.

17. The relevance core system of claim 16, wherein the relevance determination engine comprises:
   the application relevance matrix module that determines weights for various dimensions that influence purchase behavior; and
   the consumer relevance matrix module that determines weights for various dimensions that influence purchase behavior based on the user's dynamic profile.

18. The relevance core system of claim 16, wherein the relevance determination engine determines a relevance score from at least one of the weights for various dimensions that influence purchase behavior and weights for various dimensions that influence purchase behavior based on the user's dynamic profile.

19. The relevance core system of claim 18, further comprising:
   a channel determination engine that determines a channel for outputting data related to the first software program and the data related to the second software program.

20. A computer program product, comprising:
   a non-transitory computer readable storage medium having computer readable program code embodied therewith, the computer readable program code comprising;
   computer readable program code configured to receive, by a telecommunications data repository of an application relevance core engine, telecommunications data related to a plurality of electronic device users from a telecommunications source;
   computer readable program code configured to associate the telecommunications data with data related to an application downloaded by an electronic device to generate snapshot data pertaining to the application download which is stored at the telecommunications data repository, the application being one of a plurality of applications; and
   computer readable program code configured to generate both an application relevance matrix for each application of the plurality of applications and a consumer relevance matrix for each of the plurality of electronic device users to determine an application to promote to a consumer of the plurality of electronic device users from the snapshot data and the telecommunications data, wherein the consumer relevance matrix includes at least one dimension that corresponds to at least one of a location, presence, social network, or purchase history of the consumer and a weight corresponding to the at least one dimension that is determined according to a profile of the consumer, wherein determining the application to promote to the consumer comprises calculating a relevance score for each of other applications downloaded by the electronic device, and multiplying the relevance score to a value corresponding to a propensity of the consumer to purchase applications, which is determined as a function of a plurality of applications browsed and downloaded by the consumer, and comparing a result of multiplying the relevance score to the value to a threshold value to determine whether to provide promotional material related to the application to the consumer.

* * * * *